US008950568B2

(12) United States Patent
Casielles Estrada et al.

(10) Patent No.: US 8,950,568 B2
(45) Date of Patent: Feb. 10, 2015

(54) SUPPORT, MODULE, TRANSPORT SYSTEM FOR DISPLACEMENT OF PEOPLE/GOODS AND MODERNIZATION METHOD OF PEOPLE/GOODS TRANSPORT SYSTEMS

(75) Inventors: Jose Casielles Estrada, Oviedo (ES); Juan Antonio Fernandez Fidalgo, Oviedo (ES); Abdón Muñiz Camblor, Oviedo (ES)

(73) Assignee: Thyssenkrupp Norte, S.A., Mieres, Asturias (ES)

( * ) Notice: Subject to any disclaimer, the term of this patent is extended or adjusted under 35 U.S.C. 154(b) by 0 days.

(21) Appl. No.: 13/115,778

(22) Filed: May 25, 2011

(65) Prior Publication Data

US 2012/0298480 A1 Nov. 29, 2012

(51) Int. Cl.
*B65G 47/66* (2006.01)
*B66B 23/14* (2006.01)
*B66B 19/00* (2006.01)

(52) U.S. Cl.
CPC ............. *B66B 23/147* (2013.01); *B66B 19/007* (2013.01)
USPC ......... 198/324; 198/584; 198/842; 198/860.1

(58) Field of Classification Search
USPC ....................... 198/324, 583, 584, 842, 860.1
See application file for complete search history.

(56) References Cited

U.S. PATENT DOCUMENTS

| | | | | |
|---|---|---|---|---|
| 3,991,877 | A * | 11/1976 | Kraft et al. | 198/335 |
| 4,396,110 | A * | 8/1983 | Christensen | 198/576 |
| 4,535,880 | A * | 8/1985 | Boltrek | 198/330 |
| 5,307,918 | A * | 5/1994 | Rivera et al. | 198/323 |
| 5,307,920 | A * | 5/1994 | Meyer et al. | 198/335 |
| 5,341,909 | A * | 8/1994 | Ahls et al. | 198/335 |
| 5,366,060 | A * | 11/1994 | Johnson et al. | 198/323 |
| 5,638,937 | A * | 6/1997 | Birney et al. | 198/335 |
| 6,422,376 | B1 * | 7/2002 | Nichols et al. | 198/668 |
| 6,644,457 | B2 * | 11/2003 | Lauch | 198/322 |
| 6,685,002 | B1 | 2/2004 | Nurnberg et al. | |
| 6,868,962 | B2 * | 3/2005 | Schaum | 198/861.2 |
| 6,966,419 | B2 * | 11/2005 | Tada | 198/323 |
| 7,234,583 | B2 * | 6/2007 | Illedits et al. | 198/324 |
| 7,731,009 | B2 * | 6/2010 | Aulanko et al. | 198/335 |
| 8,276,737 | B2 * | 10/2012 | Lanzki et al. | 198/326 |
| 2001/0001434 | A1 * | 5/2001 | Daigh et al. | 198/301 |
| 2004/0089522 | A1 * | 5/2004 | Shaum | 198/861.1 |
| 2006/0272930 | A1 * | 12/2006 | Cotter et al. | 198/835 |
| 2010/0314224 | A1 * | 12/2010 | Deyanov et al. | 198/803.14 |

FOREIGN PATENT DOCUMENTS

GB 2 121 748 1/1984

* cited by examiner

*Primary Examiner* — Joseph Dillon, Jr.
(74) *Attorney, Agent, or Firm* — Merchant & Gould P.C.

(57) ABSTRACT

A support (1), module (101, 201) to be placed on the support, transport system is for displacement of people/goods modernized with the module and modernization method of transport systems is for displacement of people/goods. The support (1) has fixings (11) to fix the support (1) to a bearing structure (10) of the transport system, horizontal tie plates (12) to support and horizontally place the module (101, 201), lateral tie plates (13) to support and laterally place the module (101, 201), longitudinal tie plates (14) to support and longitudinally place the module (101, 201). The module has positioning and verification equipment (101A, 201A, 301A) to place the module (101, 201, 301) maintaining within tolerances the system lines of the transport system. The transport system has a support (1) and an entrance (101)/exit (201)/ central (301) module on an entrance (100)/exit (200) finished floor/in a central section.

6 Claims, 8 Drawing Sheets

SUPPORT, MODULE, TRANSPORT SYSTEM FOR DISPLACEMENT OF PEOPLE/GOODS AND MODERNIZATION METHOD OF PEOPLE/GOODS TRANSPORT SYSTEMS

FIELD OF THE INVENTION

The present invention refers to a support, to a module to be placed on the support, to a transport system for displacement of people/goods modernized with the module of the invention and to a modernization method of transport systems for displacement of people/goods, for example, escalators.

BACKGROUND OF THE INVENTION

U.S. Pat. No. 6,685,002 discloses a method of modernizing an escalator using modular components. The mechanical and electrical parts of an existing escalator are removed, leaving only the structural truss framework and cross members as well as all external parts, such as external panels, that interface with the building. A single module is placed at the top of the escalator and another module at the bottom. A plurality of incline modules are placed in the central inclined part of the escalator, at each cross member. By utilizing these modules, the assembly of the escalator is simplified. Furthermore, an entirely new escalator system using the latest technology may be installed rather than merely installing new parts in an old system.

GB 2121748 discloses a reconstruction method for improving an obsolete escalator having a frame with supporting members projecting inwardly therefrom, mounting various constituents such as an endless series of moving steps, handrails moving in synchronism with the steps, a drive unit and drive sprockets, balustrades standing upright at both sides of the steps, and rails for guiding the steps comprising the steps of: removing the constituents from the frame of the obsolete escalator; removing the supporting members from the frame; mounting a second frame in the frame, the second frame being provided with supporting and base members already attached thereto for supporting the various constituents of a new escalator; mounting the balustrades, drive unit, rails and so forth, as well as series of steps, of the new man conveyor on the second frame; and covering the gaps between the second frame and the frame by outer deck members secured to the second frame.

SUMMARY OF THE INVENTION

The invention refers to a support, to a module to be placed on the support and to a modernized transport system for displacement of people/goods. The invention also refers to a modernization method of transport systems for displacement of people/goods, incorporating a module of the invention.

Depending on the positioning of the support and the module for the system modernized according to the invention to keep the working points of the system to be modernized, the method can be fixed or adjustable.

The fixed method comprises:

1) Finding the working points of the system for the transport of people/goods or of the original escalator and transferring them to a physical point.
2) Dismounting all the components of the people/goods transport system or of the original escalator except for the structure.
3) Positioning the module supports on the structure with precision with respect to the working point.
   3.1) To position the entrance and exit supports, jigs and fixtures or templates can be used.
   3.2) On the other hand, to secure the perfect horizontality of the entrance and exit supports a level can be used.
   3.3) Verify the positioning of the entrance supports with respect to the exit supports.
4) Placing the modules on the supports making the tie plates of the supports and the module plugs coincide. If the positioning of the supports has been correct, the working points of the machine coincide with those of the modules, thanks to the manufacturing precision of the modules which guarantees a tolerance between the anchoring plugs and the working point of the module. It is necessary to verify the correct positioning of the modules before continuing.
5) Establishing an alignment system between the entrance module, which can be a lower module, in the direction of the nose line. The auxiliary alignment system can be a thin rope or an emitter—retroreflective target alignment laser system. At this point it can be verified that this auxiliary line forms the desired degrees with the horizontal.
6) Positioning the necessary central modules along the central section or inclined section in the case of difference between the entrance and exit levels, as in an escalator. The central modules comprise an alignment measurement aperture or target configured to align the central module with the auxiliary line.
7) Completing the mounting of the transport system with the rest of the elements once the upper, lower and central modules are in their place. In the head modules, that is, in the upper and lower modules, most parts of the escalator are already preassembled at the factory, since it is where most mechanisms are concentrated. The central area, which can be completed on site until closing the circuit, entails simpler execution tasks.

In the adjustable method some stages are changed:

3') Positioning the bases or supports near the working point.

4') Placing the modules on the supports, in this adjustable method, there are adjustment means in all directions between support and the module. The adjustment means enable to make the working points of the modules coincide with those of the original system to be modernized. In order to attain the horizontality of the module a level can be used.

In both procedures it is attempted to respect the original cross members of the structure, that is, the transverse beams that join the sides of the structure. However, if at a certain point the transverse beams interfere with the new system, they are eliminated and replaced by other elements of at least the same mechanical resistance.

BRIEF DESCRIPTION OF THE DRAWINGS

The following is a brief description of a series of drawings which will help understand the invention better relating to an embodiment of said invention which is presented as a non-limiting example thereof.

DETAILED DESCRIPTION

Figure 1:
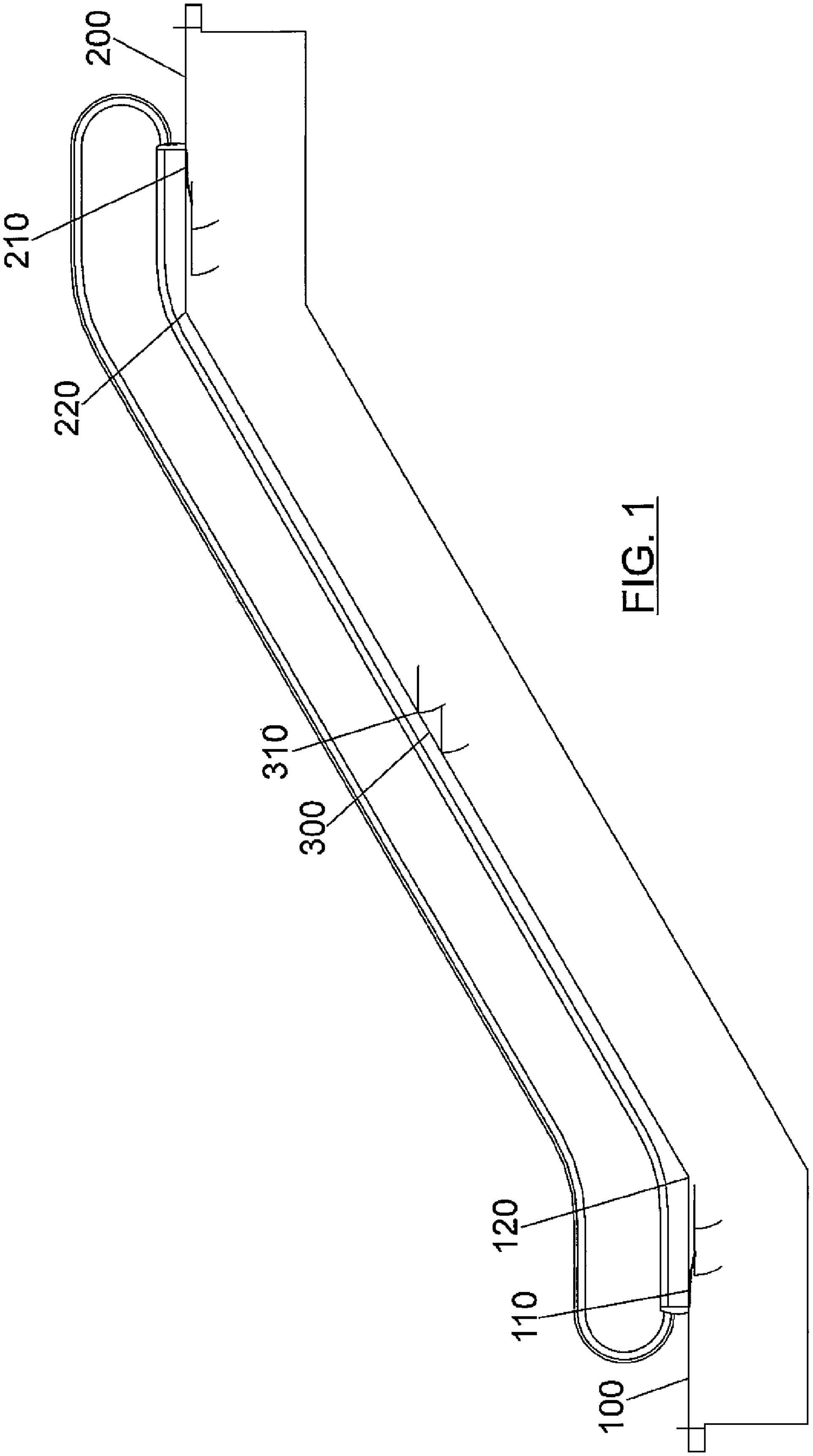
FIG. 1 shows a lateral view of a system of the invention with the lines of the system.
Figure 2:
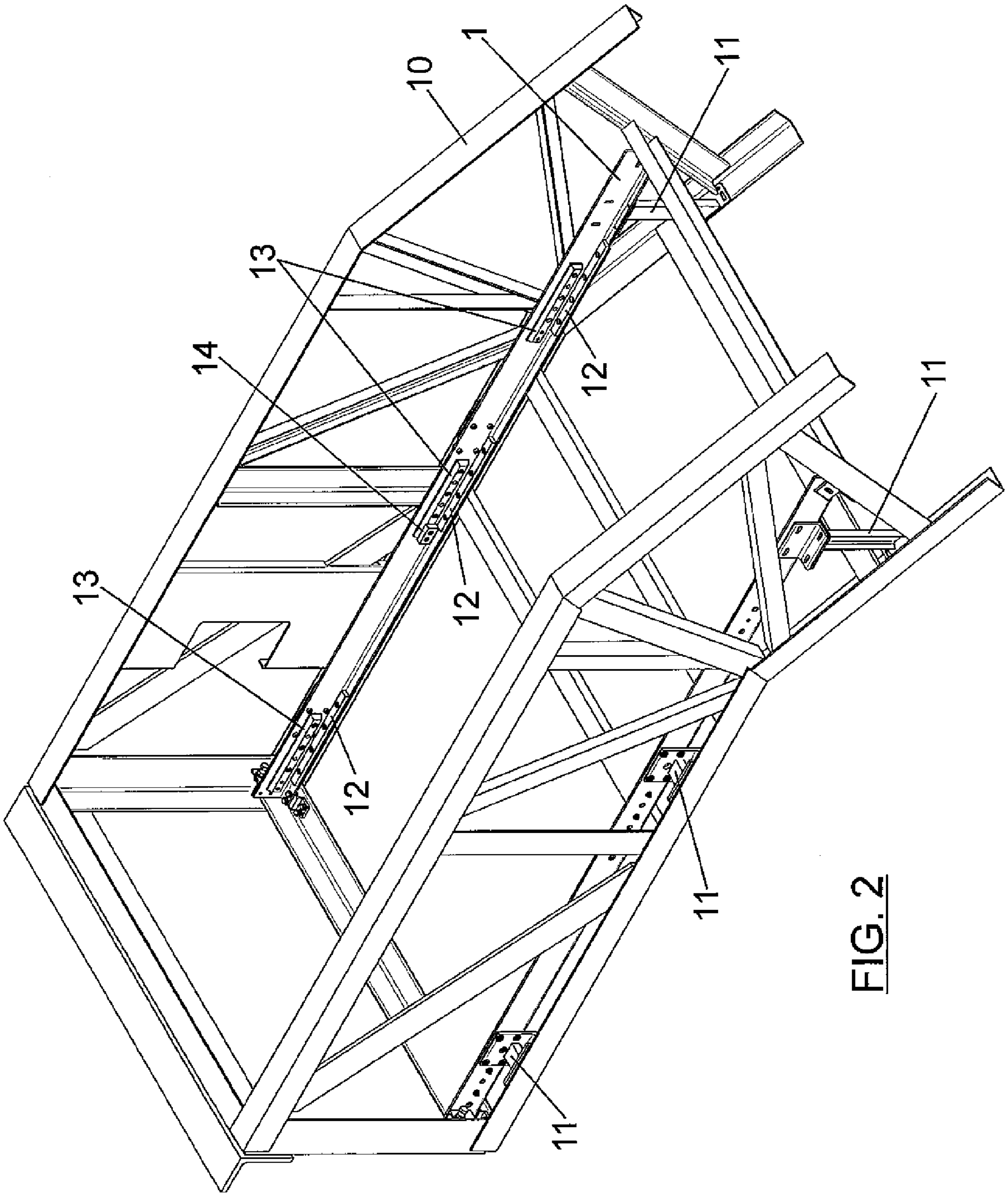
FIG. 2 shows a perspective view of the support for a head module of the invention.
Figure 3:
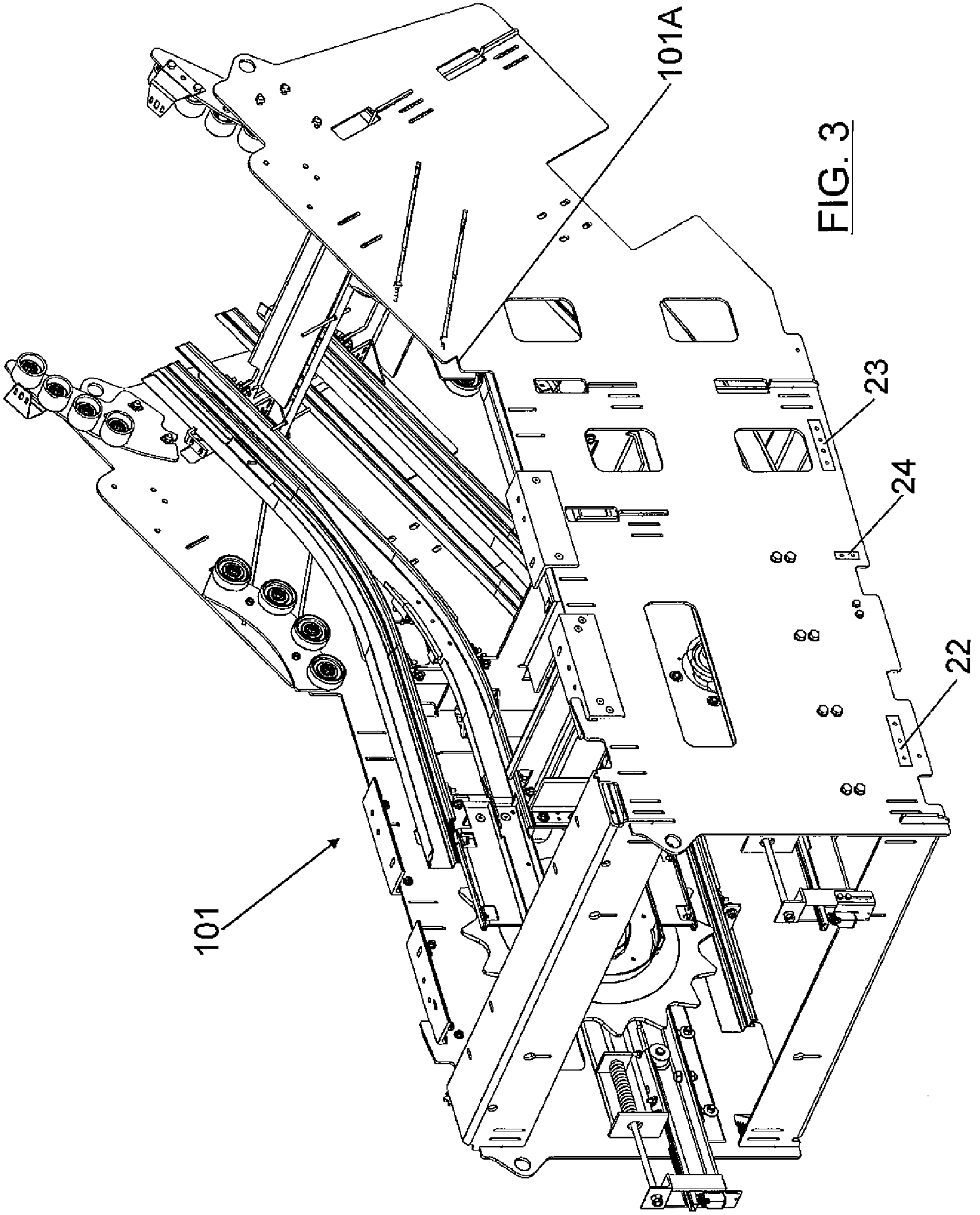
FIG. 3 shows a perspective view of an entrance module of the invention.

A first aspect of the invention refers to a support (1) for module (101, 201) of the transport system for displacement of people/goods comprising a plurality of plates. The transport system has system lines including an entrance finished floor (100) defined by a level of entrance fixed plate (110). An exit finished floor (200) is defined by a level of exit fixed plate (210). A nose line (300) is defined by a nose (310) of the plates in a central section between the entrance finished floor (100) and the exit finished floor (200), the plate nose is the most external of the plates when they are in the central section: if the system is an escalator, the nose of the step is the edge between the tread and the riser. The system also includes an entrance working point (120), intersection of the nose line (300) and the entrance finished floor (100); and an exit working point (220), intersection of the nose line (300) and the exit finished floor (200). The support (1) includes a plurality of fixings (11) configured to fix the support (1) to a bearing structure (10) of the transport system; a plurality of horizontal tie plates (11) configured to support and horizontally place the module (101, 201); a plurality of lateral tie plates (13) configured to support and laterally place the module (101, 201); a plurality of longitudinal tie plates (14) configured to support and longitudinally place the module (101, 201).

The horizontal tie plates (12), the lateral tie plates (13) and the longitudinal tie plates (14) comprise adjustment means (121, 131, 141) to place the module (101, 201) maintaining within tolerances the system lines of the transport system.

The adjustment means (121, 131, 141) include a horizontal threaded adjustment (121); a lateral threaded adjustment (131); and a longitudinal threaded adjustment (141).

In an alternate embodiment, a module (101, 201, 301) for a transport system for displacement of people and/or goods includes a plurality of plates. The transport system has system lines including an entrance finished floor (100) defined by a level of entrance fixed plate (110). An exit finished floor (200) is defined by a level of exit fixed plate (210). A nose line (300) is defined by a nose (310) of the plates in a central section between the entrance finished floor (100) and the exit finished floor (200). The system also includes an entrance working point (120), intersection of the nose line (300) and the entrance finished floor (100); an exit working point (220), intersection of the nose line (300) and the exit finished floor (200); and positioning and verification means (101A, 201A, 301A) configured to place the module (101, 201, 301) maintaining within tolerances the system lines of the transport system.

The module (101, 201) includes a plurality of horizontal plugs (22) configured to be supported and horizontally located in horizontal tie plates (12) of a support (1) for the module (101, 201); a plurality of lateral plugs (23) configured to be supported and laterally located in lateral tie plates (13) of a support (1) for the module (101, 201); and a plurality of longitudinal plugs (24) configured to be supported and longitudinally located in longitudinal tie plates (14) of a support (1) for the module (101, 201).

Figure 4:
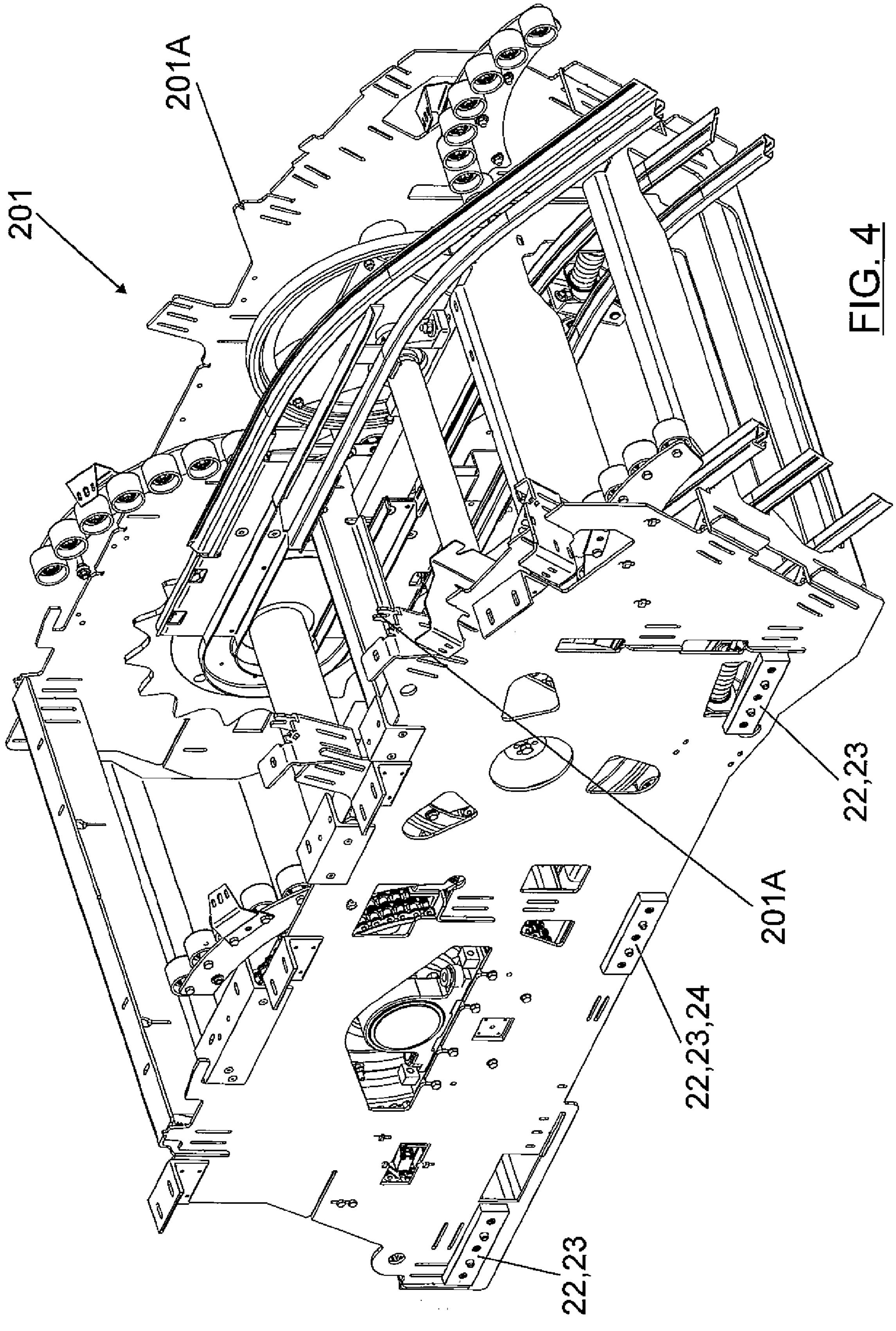
FIG. 4 shows a perspective view of an exit module of the invention.
Figure 4A:
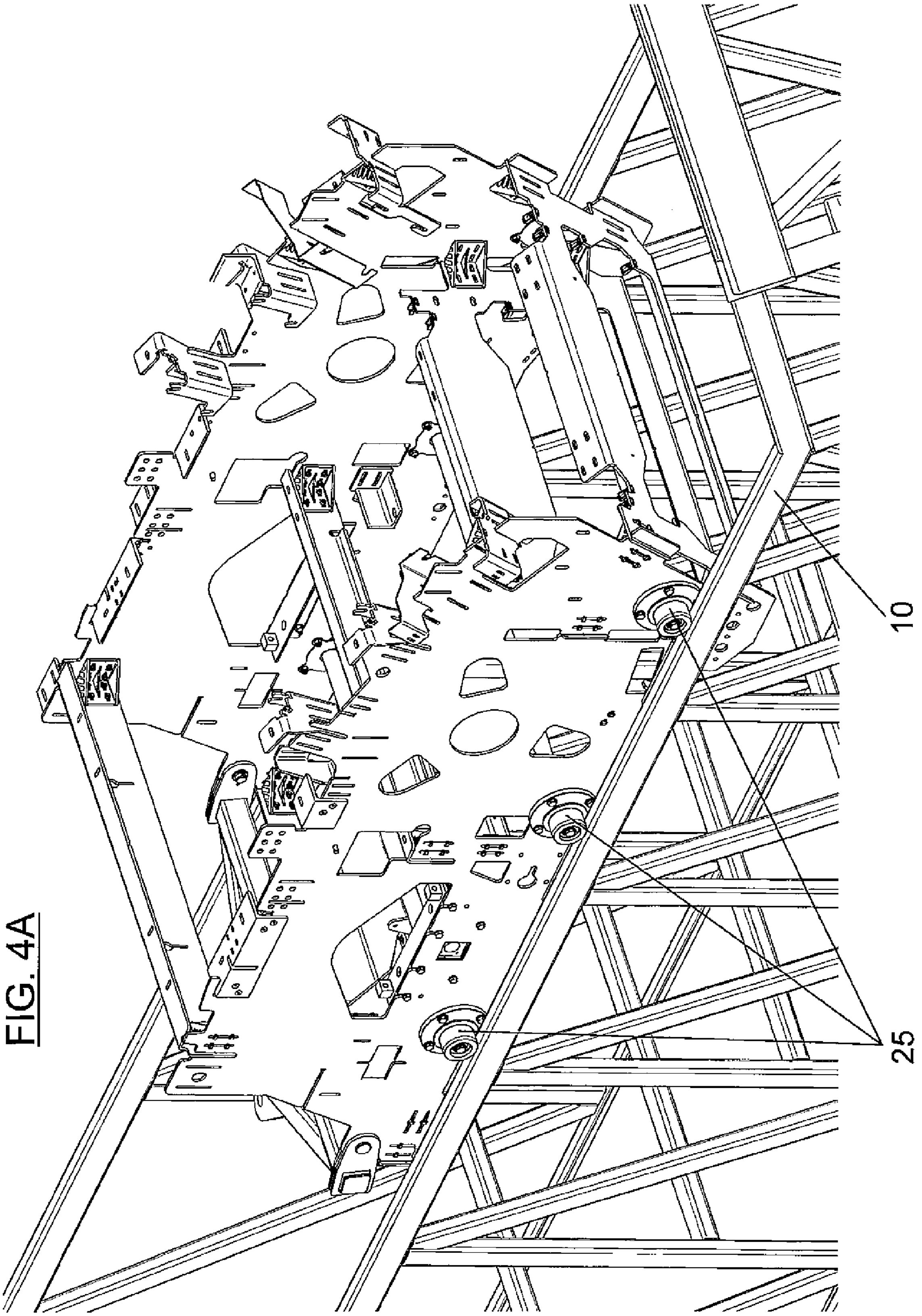
FIG. 4A shows a module of the invention which has rolling means configured to roll on a rolling surface of the bearing structure.
Figure 5:
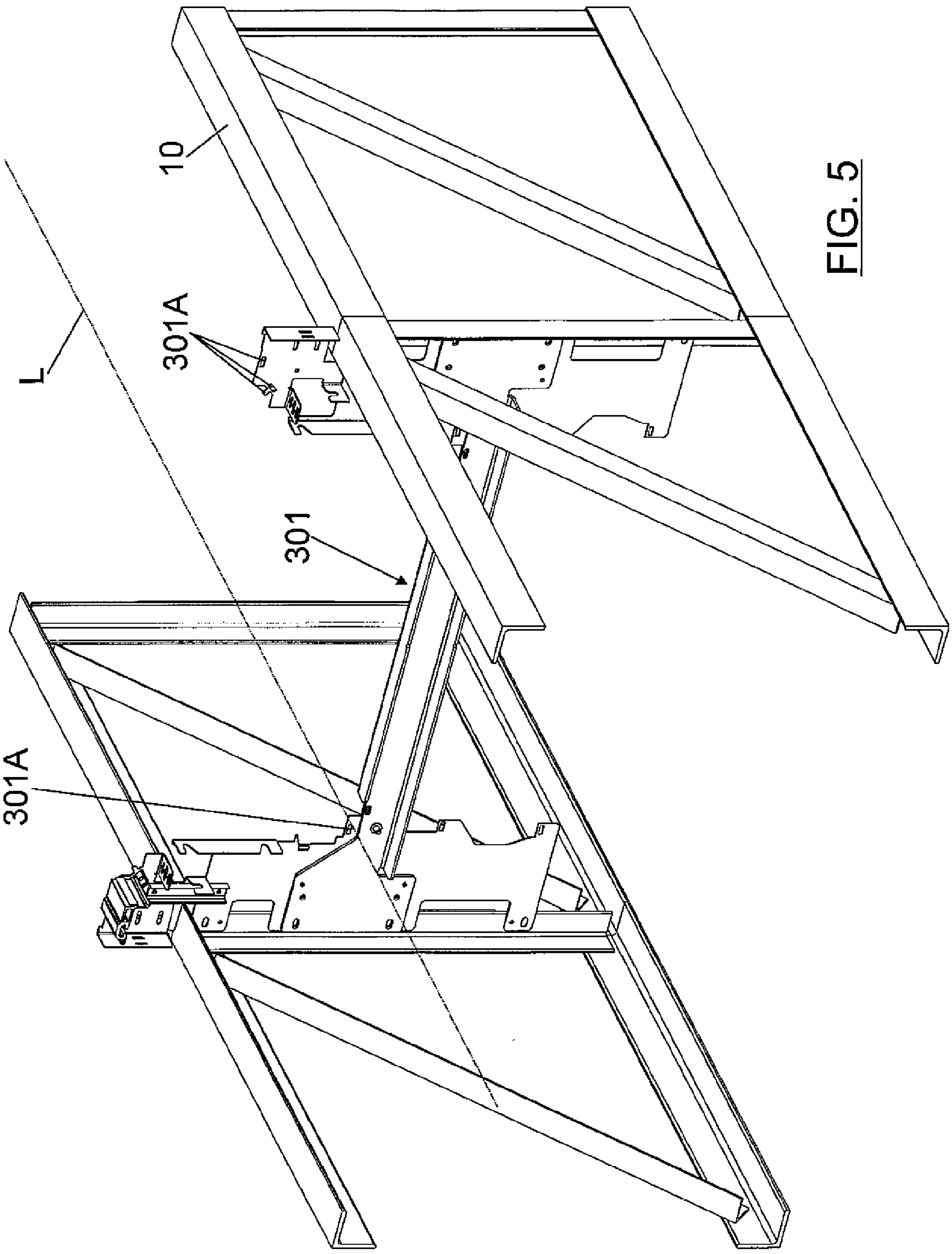
FIG. 5 shows a perspective view of a central module of the invention.
Figure 6:
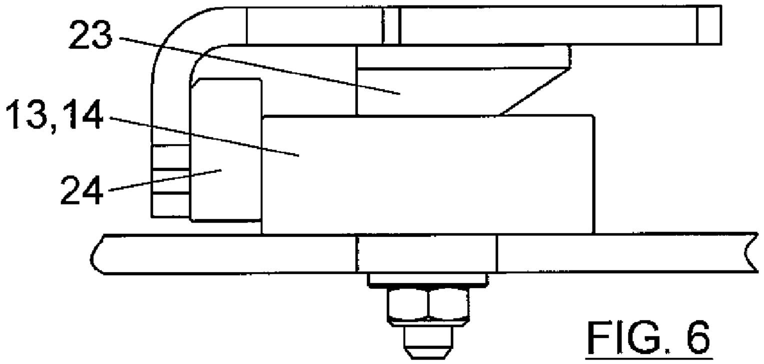
FIG. 6 shows a detailed view of tie plates and plugs of the invention.
Figure 7:
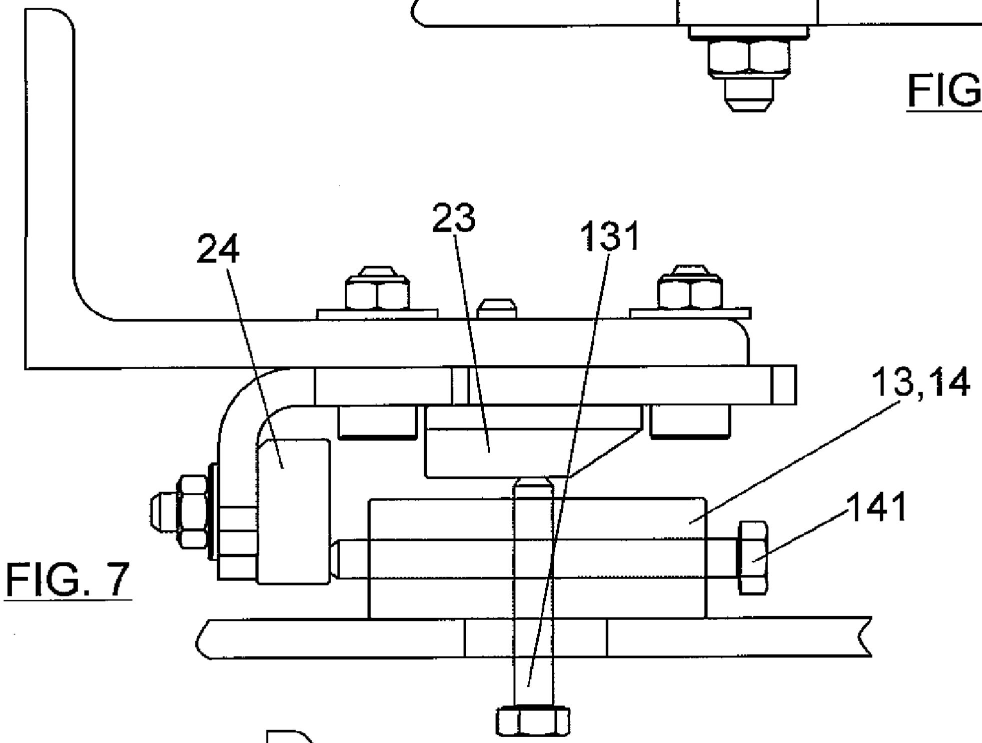
FIGS. 7, 7A show a detailed view of the adjustment means between a support of the invention and a module of the invention.
Figure 7A:
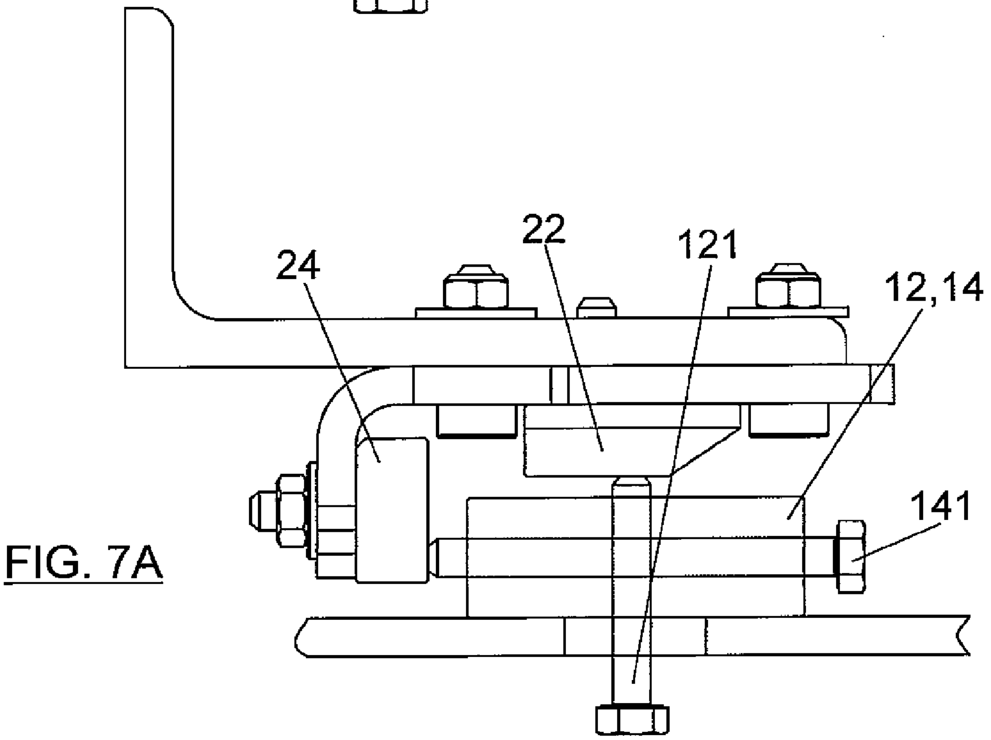
Figure 8:
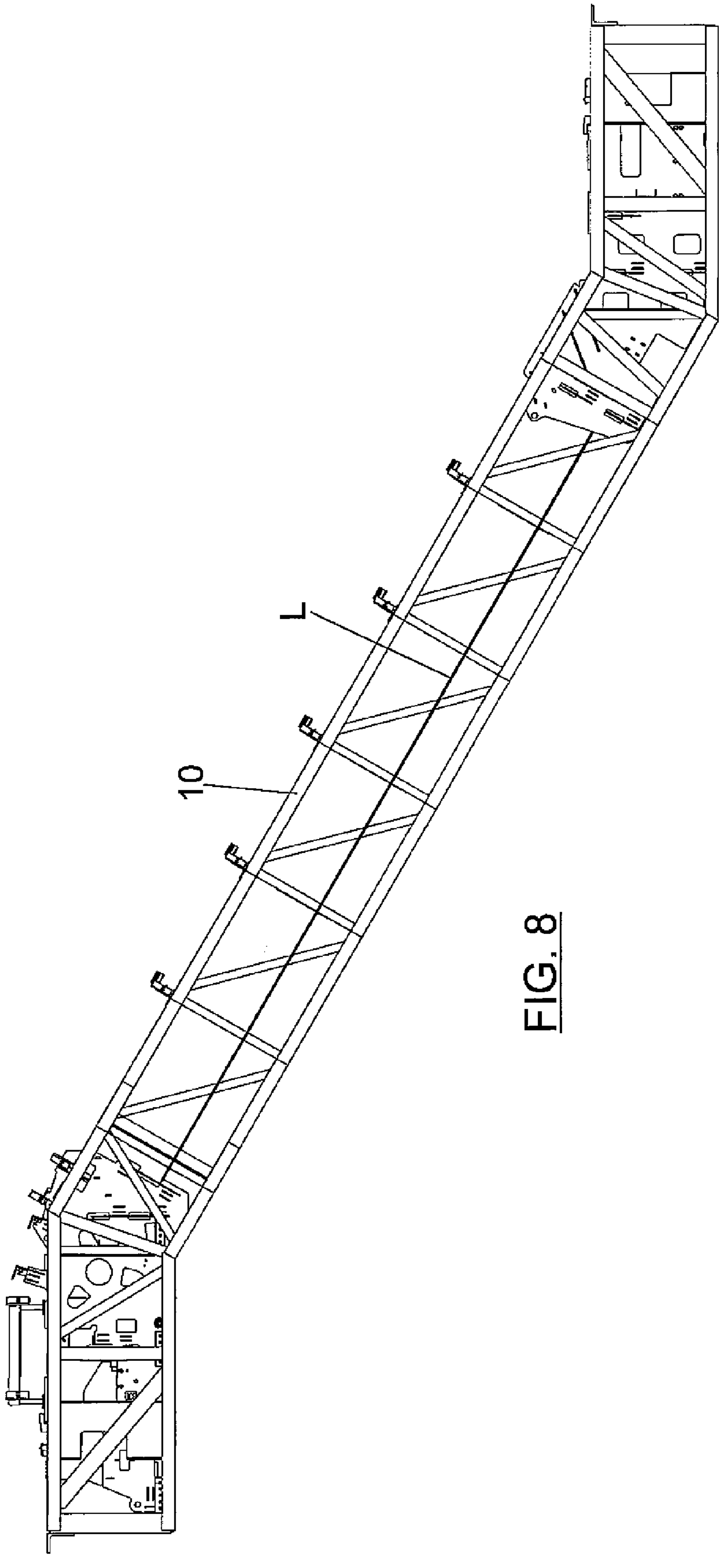
FIG. 8 shows a lateral view of a system of the invention with the alignment lines.

According to several embodiments of the invention, the tie plates (22, 23, 24) can be grouped in the same element, as shown in FIG. 4.

The module (101, 201) rolling means (25) configured to roll on a rolling surface of the bearing structure (10) for the module (101, 201). These rolling means facilitate the placement of the module (101, 201) in the support (1). The weight of the module (101, 201) is usually high, since it contains numerous components, so any help which facilitates the placement of the module (101, 201) in the support (1) contributes to a reduction of the mounting time.

The entrance positioning and verification means (101A) are configured to maintain within tolerances the entrance working point (120) forming an entrance module (101).

The exit positioning and verification means (201A) are configured to maintain within tolerances the exit working point (220) forming an exit module (201).

The central positioning and verification means (301A) are configured to maintain within tolerances the nose line (300) forming a central module (301). The central positioning and verification means (301A) configured to align the central module (301) with the alignment line L include an element selected between an alignment measurement aperture and a target.

A third aspect of the invention refers to a transport system for people/goods includes a support (1) and an entrance module (101) on an entrance finished floor (100); a support (1) and an exit module (201) on an exit finished floor (200); and a support (1) and a central module (301) in a central section.

The system is an escalator including a plurality of steps where: the entrance finished floor (100) is a lower finished floor defined by a level of lower fixed plate (110); the exit finished floor (200) is an upper finished floor defined by a level of upper fixed plate (210); the nose line (300) is defined by the nose (310) of the escalator steps in a central section. The system includes a lower working point (120) intersection of the nose line (300) and the lower finished floor (100); and an upper working point (220) intersection of the nose line (300) and the upper finished floor (200).

A fourth aspect of the invention refers to a modernization method of transport systems for displacement of people and/or goods including a plurality of plates. The transport system has system lines including an entrance finished floor (100) defined by a level of entrance fixed plate (110); an exit finished floor (200) defined by a level of exit fixed plate (210); a nose line (300) is defined by a nose (310) of the plates in a central section comprised between the entrance finished floor (100) and the exit finished floor (200); an entrance working point (120) intersection of the nose line (300) and the entrance finished floor (100); an exit working point (220) intersection of the nose line (300) and the exit finished floor (200). The method includes locating the working points (120, 220) of the transport system, which can be an escalator to be modernized; transferring the working points (120, 220) to an end point at the transport system; dismounting components of the transport system, which can be an escalator to be modernized, except for a bearing structure (10); placing supports (1) of the module (101, 201, 301) on the bearing structure (10); placing the modules (101, 201, 301) on the supports (1); establishing an alignment system between the entrance module (101), which can be an upper module and an exit module (201), which can be a lower module, in a direction parallel to the nose line to obtain an alignment line L, the alignment system can be a thin rope or a target-emitter laser system, at this point it can be verified that this alignment line L forms the desired degrees with the horizontal; and positioning the necessary central modules (301) along the central section or inclined section in the case of difference between the entrance and exit levels, as in an escalator.

The method may also include placing supports (1) of the module (101, 201) on the bearing structure (10) with precision with respect to the working points (120, 220); to attain the precision required it can be necessary to use jigs and fixtures or templates; to secure the perfect horizontality of the supports it is necessary to use a level.

13b) placing the modules (101, 201) on the supports (1) making the tie plates (12, 13, 14) and the plugs (22, 23, 24) coincide so that the working points of the modules (101, 201) coincide with the working points of the transport system, securing the correct positioning of the supports (1), the working points of the transport system coincide with those of the modules (101, 201) thanks to the manufacturing precision of the modules (101, 201) which guarantees a tolerance between the anchoring plugs (22, 23, 24) and the working point of the module (101, 201), it is necessary to verify the correct positioning of the modules (101, 201) before continuing with the method.

The method may further include placing supports (1) of the module (101, 201) on the bearing structure (10) approximately with respect to the working points (120, 220); 14b) placing the modules (101, 201) on the supports (1) adjusting a position of the modules (101, 201) on the supports (1) so that the working points of the modules (101, 201) coincide with the working points of the transport system; in this case an element selected between the support (1) and the module (101, 201) has adjustment elements in all directions. The adjustment means enable to make the working points of the modules coincide with those of the original system; in order to attain the horizontality of the modules (101, 201), a level can be used.

The method may include fixing the central modules (301) to the bearing structure (10) without fixing the central modules (301) to transverse elements to the movement direction of the transport system of the bearing structure (10).

The modernization method also includes completing a mounting of the transport system, mounting complementary elements after having installed the entrance module (101), the exit module (201) and the central module (301). In the head modules, entrance module (101) and exit module (201), most parts of the escalator are already pre-assembled at the factory, since it is where most mechanisms are concentrated. The central area is completed on site until closing the circuit but it is a simpler process.

The invention claimed is:

1. Transport system for people and/or goods comprising:

an exit module for displacement of people and/or goods comprising:

a plurality of plates, the transport system having system lines comprising:

an exit finished floor defined by a level of an exit fixed plate;

a nose line defined by a nose of the plates in a central section between an entrance finished floor and the exit finished floor;

an exit working point at an intersection of the nose line and the exit finished floor;

exit positioning and verifying means located within tolerances at a position of the exit working point of the exit module;

a plurality of horizontal plugs configured to be supported and horizontally located in horizontal tie plates of a support for the exit module;

a plurality of lateral plugs configured to be supported and laterally located in lateral tie plates of a support for the exit module;

a plurality of longitudinal plugs configured to be supported and longitudinally located in longitudinal tie plates of a support for the exit module; and a support comprising:

a plurality of fixings configured to fix the support to a bearing structure of the transport system;

a plurality of horizontal tie plates configured to support and horizontally place the exit module;

a plurality of lateral tie plates configured to support and laterally place the exit module; and a plurality of longitudinal tie plates configured to support and longitudinally place the exit module.

2. The transport system of claim 1, wherein the horizontal tie plates, the lateral tie plates and the longitudinal tie plates comprise adjusting means for placing the exit module and making the exit working point of the exit module coincide with an exit working point of the transport system.

3. The transport system of claim 2, the adjusting means comprising:

a) a horizontal threaded adjustment;

b) a lateral threaded adjustment; and c) a longitudinal threaded adjustment.

4. Transport system for people and/or goods comprising:

an entrance module for displacement of people and/or goods comprising:

a plurality of plates, the transport system having system lines comprising:

an entrance finished floor defined by a level of an entrance fixed plate;

a nose line defined by a nose of the plates in a central section between the entrance finished floor and an exit finished floor;

an entrance working point at an intersection of the nose line and the entrance finished floor;

entrance positioning and verifying means located within tolerances at a position of the entrance working point of the entrance module;

a plurality of horizontal plugs configured to be supported and horizontally located in horizontal tie plates of a support for the entrance module;

a plurality of lateral plugs configured to be supported and laterally located in lateral tie plates of a support for the entrance module;

a plurality of longitudinal plugs configured to be supported and longitudinally located in longitudinal tie plates of a support for the entrance module; and a support comprising:

a plurality of fixings configured to fix the support to a bearing structure of the transport system;

a plurality of horizontal tie plates configured to support and horizontally place the entrance module;

a plurality of lateral tie plates configured to support and laterally place the entrance module; and a plurality of longitudinal tie plates configured to support and longitudinally place the entrance module.

5. The transport system of claim 4, wherein the horizontal tie plates, the lateral tie plates and the longitudinal tie plates comprise adjusting means for placing the entrance module and making the entrance working point of the entrance module coincide with an entrance working point of the transport system.

6. The transport system of claim 5, the adjusting means comprising:

a) a horizontal threaded adjustment;

b) a lateral threaded adjustment; and c) a longitudinal threaded adjustment.

* * * * *